United States Patent [19]

Weaver et al.

[11] 3,762,861

[45] Oct. 2, 1973

[54] POLYAMIDE AND POLYESTER FIBERS DYED WITH A 1,3,4-THIADIAZOLYLAZO-3-(CYCLOHEXYLAMINO)ACYLANILIDE DYE

[75] Inventors: Max A. Weaver; James M. Straley; William H. Moore, all of Kingsport, Tenn.

[73] Assignee: Eastman Kodak Company, Rochester, N.Y.

[22] Filed: Mar. 27, 1972

[21] Appl. No.: 238,531

Related U.S. Application Data

[62] Division of Ser. No. 833,744, June 16, 1969, Pat. No. 3,673,169.

[52] U.S. Cl. .................. 8/41 R, 8/41 B, 8/41 C, 260/158
[51] Int. Cl. .................. D06p 3/26, D06p 3/54

[58] Field of Search .................. 260/158; 8/41 B, 8/41 C

[56] References Cited
UNITED STATES PATENTS

| | | | |
|---|---|---|---|
| 2,286,795 | 6/1942 | Dickey et al. | 260/207.1 |
| 2,289,349 | 7/1942 | Dickey et al. | 260/207.1 |
| 2,289,376 | 7/1942 | McNally et al. | 260/152 |
| 2,683,708 | 7/1954 | Dickey et al. | 260/158 |

*Primary Examiner*—Mayer Weinblatt
*Assistant Examiner*—T. J. Herbert, Jr.
*Attorney*—Cecil D. Quillen, Jr. et al.

[57] ABSTRACT

Fibers having a basis of a synthetic linear polyamide or linear polyester are dyed bright, fast, scarlet to pink shades with a monoazo compound containing a 1,3,4-thiadiazolyl diazo component and an N-cyclohexyl-m-acylamidoaniline coupling component.

4 Claims, No Drawings

POLYAMIDE AND POLYESTER FIBERS DYED WITH A 1,3,4-THIADIAZOLYLAZO-3-(CYCLOHEXYLAMINO)ACYLANILIDE DYE

This application is a divisional of our Ser. No. 833,744, filed on June 16, 1969, for "Monoazo Compounds and Textile Materials Dyed Therewith," and now U.S. Pat. No. 3,673,169.

This invention relates to certain novel monoazo compounds and, more particularly, to thiadiazolylazoaniline compounds in which the nitrogen atom of the aniline coupling component is substituted with a cyclohexyl group and a ring carbon atom of the coupling component is substituted with an acylamido group. This invention also concerns polyester and nylon fibers dyed with the novel monoazo compounds.

The novel monoazo compounds have the formula

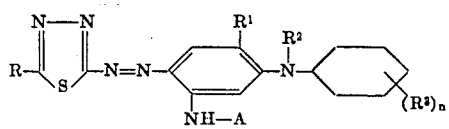

wherein

R is halogen, alkanoylamido, alkylsulfonyl, $R^4$- or $R^4—X—$ wherein $R^4$ is an alkyl, allyl, cycloakyl or aryl radical, and X is an oxgyen or sulfur atom;

A is an acyl radical;

$R^1$ is hydrogen, alkyl or alkoxy;

$R^2$ is hydrogen or an alkyl radical;

$R^3$ is low alkyl; and n is 0, 1, 2, or 3.

The novel azo compounds impart bright scarlet to pink shades on polyester and nylon textile materials. The compounds of the invention are unique in that they posses excellent properties when applied to either nylon or polyester fibers according to known dyeing techniques. For example, the azo compounds exhibit excellent dyeability, e.g. buildup and affinity, for and light-fastness on nylon fibers. The azo compounds also exhibit good migration properties on polyamide fibers and excellent resistance to sublimation on polyester fibers.

The alkyl radicals which $R^4$ can represent can be straight- or branch-chain, substituted or unsubstituted alkyl having from 1 to about 10 carbon atoms. Methyl, ethyl, propyl, isopropyl, butyl, isobutyl, amyl and hexyl are typical of the unsubstituted alkyl groups. Typical groups which can be present on alkyl radicals $R^4$ are hydroxy, e.g., 2-hydroxyethyl, 3-hydroxypropyl; halogen, e.g., 2-chloroethyl, 3-bromopropyl; lower alkoxycarbonyl, e.g., 2-ethoxycarbonylethyl, 3-methoxycarbonylpropyl; lower alkanoyloxy, e.g., 2-acetoxyethyl; lower alkoxy, e.g., 2-methoxyethyl; lower alkanoyl, e.g., 2-acetylethyl; aroyl, e.g., benzoylmethyl; cyano, e.g., 2-cyanoethyl; carbamoyl, e.g., 2-carbamoylethyl; dicarboximido, e.g. 3-succinimidopropyl; etc. As used herein to describe an alkyl moiety-containing group, "lower" designates a carbon content of up to about 4 carbon atoms. The alkyl radicals represented by $R^4$ can also be substituted with cycloakyl, e.g., cyclopentyl, cyclohexyl, cycloheptyl, and lower alkyl-substituted derivatives thereof, and with aryl, e.g., phenyl and phenyl substituted with lower alkyl, lower alkoxy, or halogen. Cyclohexylmethyl, 2-cyclopentylethyl, 4-ethylcyclohexylmethyl, 4-methoxycyclohexylmethyl, 2-(3-chlorocyclohexyl)ethyl, benzyl, p-methylbenzyl, 2-p-ethoxyphenylethyl, 4-chlorobenzyl, 2-phenylethyl, etc. are illustrative of the cycloalkylalkyl and arylalkyl groups which $R^4$ can represent. The unsubstituted alkyl radicals which $R^4$ can represent preferably are lower alkyl, e.g. methyl, ethyl, propyl, and butyl, while the preferred substitutrd alkyl radicals contain from about 2 to about 8 carbon atoms, e.g., 2-hydroxyethyl, benzyl, cyclohexylmethyl, etc.

The aryl groups which $R^4$ can represent preferably are monocyclic, carbocyclic aryl such as unsubstituted phenyl and phenyl substituted, for example, with lower alkyl, lower alkoxy, halogen, etc. The cycloalkyl groups represented by $R^4$ include cyclopentyl, cyclohexyl, cycloheptyl and lower alkyl-substituted derivatives thereof. Specific examples of the cycloalkyl and aryl groups which $R^4$ can represent appear in the preceding paragraph. Chlorine and bromine are examples of the halogen atoms which R can represent. Examples of the alkanoyl moiety of the alkanoylamido groups represented by R and examples of the alkylsulfonyl groups which R can represent appear below in the definition of A. R preferably represents those groups having the formula $R^4—X—$. Specific examples of the groups collectively represented by $R^4$-X- e.g., alkylthio, alkoxy, arylthio, aryloxy, etc., are set forth in the examples of the novel azo compounds.

The acyl radicals represented by A can be formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, sulfamoyl, lower alkylsulfamoyl, furoyl, etc. The alkanoyl groups can be substituted with substituents such as halogen, aryl, cyano, lower alkoxy, benzyloxy, lower alkylthio, lower alkylsulfonyl, etc. The alkylsulfonyl groups also can be substituted, for example with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2-chloroethylsulfonyl, are examples of the alkanoyl, alkoxycarbonyl and alkylsulfonyl groups which A can represent. The aryl group, designated Ar, of the arylalkanoyl, aroyl, i.e., arylcarbonyl, aryloxycarbonyl, arylsulfonyl, and arylcarbamoyl groups preferably is monocyclic carbocyclic aryl such as unsubstituted phenyl and phenyl substituted with, for example, lower alkyl, lower alkoxy, halogen, etc. Tolyl, anisyl, p-bromophenyl and o,p-dichlorophenyl are typical of such aryl groups. Dimethylcarbamoyl, ethylcarbamoyl, propylcarbamoyl, butylcarbamoyl, phenylcarbamoyl and dimethylcarbamoyl are examples of the substituted carbamoyl groups.

Examples of the alkyl and alkoxy groups represented by $R^1$ appear in the description relating to R. The alkyl group represented by $R^2$ can be straight- or branch-chain, substituted or unsubstituted alkyl of from 1 to about 8 carbon atoms such as, for example, methyl, ethyl, isopropyl, propyl, butyl, isobutyl, 1-methylbutyl, amyl, 1,2-dimethylpropyl, 1,3-dimethylbutyl, hexyl, 2-ethylhexyl, etc. Preferably, one of $R^1$ and $R^2$ is lower alkyl and the other is hydrogen. Lower cyanoalkyl, lower alkoxy-lower-alkyl and lower alkanoyloxy-lower alkyl are examples of the substituted alkyl groups represented by $R^2$. 2-Cyanoethyl, 3-ethoxypropyl, 2-methoxyethyl, 2-propionoxyethyl, 2,3-diacetoxypropyl, etc. are examples of some specific substituted alkyl groups represented by $R^2$. Preferably, the unsubstituted alkyl groups represented by $R^2$ are lower alkyl, the cyanoalkyl groups contain 3 or 4 carbon atoms, the alkoxyalkyl groups contain 3 to about 6 carbon atoms and the alkanoyloxyalkyl groups contain about 4 to about 6 carbon atoms.

The novel azo compounds which, because of their economy, and, especially, their excellent properties, are particularly valuable dyes for nylon and polyester textile materials have the formula

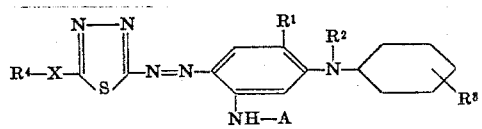

wherein $R^4$ is lower alkyl, especially methyl or ethyl; X is —O— 0or —S—; A is lower alkanoyl, lower alkoxycarbonyl, lower alkylsulfonyl, benzoyl or lower alkylcarbamoyl; $R^1$ is hydrogen or methyl; $R^2$ is hydrogen or lower alkyl; one of $R^1$ and $R^2$ is hydrogen; and $R^2$ is hydrogen or methyl.

The novel azo compounds are prepared according to known procedures by diazotizing an amine having the formula

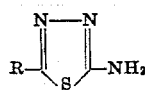

and coupling the resulting diazonium salt with a coupler having the formula

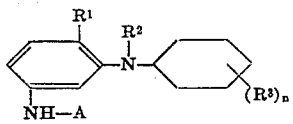

wherein R, $R^1$, A, $R^2$, $R^3$ and n are defined above.

The diazotizable aminothiadiazoles are synthesized by techniques described in the literature (Ber. 28, 946; British Patent 726,045; J Chem. Soc., 1976, 2700–2704). For example, 2-amino-5-mercapto-1,3,4-thiadiazole can be treated with alkylating and arylating agent, such as alkyl halides, alkyl sulfates, alkyl phosphates, aryl halides, etc., at elevated temperatures in the presence of a solvent and a base such as potassium carbonate or sodium acetate.

The couplers can be synthesized by a variety of methods. For example, an acylamidoaniline or an nitroacylanilide can be condensed with a cyclohexanone at elevated pressures and temperatures in the presence of a hydrogenation catalyst such as platinum to obtain the N-cyclohexyl-m-acylamidoaniline which, if desired, can be treated with an alkylating agent to yield the N-alkyl-N-cyclohexyl-m-acylamidoaniline coupler.

The preparation of the couplers and the novel azo compounds of the invention is further illustrated by the following examples.

EXAMPLE 1

A mixture of 3-aminoacetanilide (45.0 g.), cyclohexanone (74.0 g.), ethanol (100 ml.), 5 percent Pt on carbon (2.0 g.), and glacial acetic acid (2 drops) is hydrogenated in a autoclave at 165° C. and 1,000 psi until the hydrogen uptake ceased. The catalyst is removed from the reaction mixture by filtration. The ethanol is removed by evaporation and the product is recrystallized from 600 ml. ethanol and 300 ml. water. The product, 3-(cyclohexylamino)acetanilide, melts at 124°–125° C. Analysis: Calcd. for $C_{14}H_{20}N_{2O}$: C, 72.4; H, 8.7; N, 12.1.

Found: C 72.2; H, 8.8; N, 12.1.

EXAMPLE 2

3-(Cyclohexylamino)acetanilide (11.7 g.), triethyl phosphate (15 ml.), and bromethane (5.4 g.) are reacted on a steam bath for 6 hr. An additional 5.4 g. of bromoethane is added and the reaction is heated 4 hr. longer. The reaction mixture is drowned in water and ice. After the mixture is basified by the addition of $NH_4OH$, the aqueous portion is removed by decantation. The product, 3-(N-cyclohexyl-N-ethylamino)- recrystallized is recrylstallized from 200 ml. methanol plus 400 ml. water. It melts at 88° to 90° C.

Analysis: Calcd. for $C_{16}H_{24}N_2O$: C, 73.8; H, 9.3; N, 10.7.

Found: C, 73.7; H, 9.3; N, 10.7.

EXAMPLE 3

A mixture of 3-(cyclohexylamino)acetanilide (6.96 g.), acrylonitrile (5.3 g.), cuprous chloride (0.5 g.), and acetic acid (10 ml.) is heated at 90° to 110° C. for 4.5 hr. The product is isloated by drowning in water and decanting off the aqueous layer. The product, 3(N,2-cyanoethyl-N-cyclohexylamino)acetanilide, does not solidify readily but is pure enough to be used for preparing dyes.

EXAMPLE 4

A mixture of 3-amino-p-acetotoluidide (16.4 g.), cyclohexanone (24.7 g.), ethanol (50 ml.), acetic acid (2 drops), and 5 percent platinum on carbon catalyst (1.0 g.), is hydrogenated in an autoclave at 165° C. and 1,000 psi until the hydrogen uptake ceases. The reaction mixture is filtered to remove the catalyst and the ethanol is removed by evaporation. The product, after being recrystallized from water-ethanol, melts at 118° to 119° C. It has the structure:

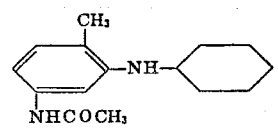

EXAMPLE 5

3-Amino-p-acetoanisidide (90.0 g.) and cyclohexanone (122.0 g.) are reacted as described in Example 4. The product, 3-(cyclohexylamino)-p-acetoanisidide, after being recrystallized from ethanol, melts at 135° to 137° C.

EXAMPLE 6

To 5.0 ml. of conc. $H_2SO_4$ is added 0.72 g. $NaNO_2$ with stirring. The solution is cooled and 10 ml. 1:5 acid is added below 15° C. After cooling to about 3° C., 2-amino-5-ethylthio-1,3,4-thiadiazole (1.61 g.) is added followed by 10 ml. of additional 1:5 acid at 0°–5° C. After stirring for 2 hr. at 0°–5° C., the diazonium solution is added to 3-cyclohexylamino-p-acetotoluidide (2.46 g.) in 40 ml. of 1:5 acid at less than 10° C. The coupling is buffered by the addition of ammonium acetate and kept at about 5° C. for 2 hr. Water is added to precipitate the dye. The product is then collected by filtration, washed with water, dried in air, and recrystallized from methanol. The dye, which melts at 164° to 166° C., produces bright pink shades on nylon fabrics and has the structure:

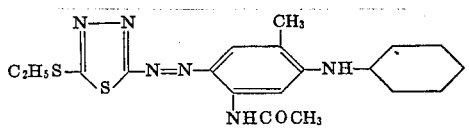

EXAMPLE 7

2-Amino-5-methylthio-1,3,4-thiadiazole (1.47 g.) is diazotized and coupled with 3-(N-cyclohexylamino)-p-acetoanilide (2.32 g.) as described in Example 6 to yield 5-(N-cyclohexylamino)-2-(5-methlthio-1,3,4-thiadiazol-2-ylazo)-acetanilide which imparts a pink shade of excellent fastness to light to polyamide fibers.

EXAMPLE 8

According to the procedure described in Example 6, 2-amino-5-methylthio-1,3,4-thiadiazole (1.47 g.) is diazotized and coupled with 3-(cyclohexylamino)benzanilide (2.94 g.). The product, 5-(cyclohexylamino)-2-(5-methylthio-1,3,4-thiadiazol-2-ylazo)benzanilide, produces bright pink shades on polyamide fibers.

EXAMPLE 9

2-Amino-5-ethoxy-1,3,4-thiadiazole (1.45 g.) is diazotized and coupled with 3-(N-cyclohexyl-N-propylamino)-acetanilide (2.74 g.) as described in Example 6 to yield 5-(N-cyclohexyl-N-propylamino)-2-(5-ethoxy-1,3,4-thiadiazol-2-ylazo)acetanilide. This azo compound produces bright scarlet shades on nylon and exhibits excellent fastness to light.

The thiadiazolylazo compounds set forth in the Table are prepared according to the general procedure described in Example 6 and conform to formula (I). The color given for each compound is the shade produced by the dye on nylon 66 fibers.

TABLE

| Ex. No. | R | A | $R^1$ | $R^2$ | $(R^3)n$ | Color |
|---|---|---|---|---|---|---|
| 10 | $C_2H_5S$— | —$COCH_2CH_3$ | —$CH_3$ | H | H | Pink. |
| 11 | $C_2H_5S$— | —$COCH(CH_3)_2$ | —$CH_3$ | H | H | Do. |
| 12 | $C_2H_5S$— | —$COCH_2CH(CH_3)_2$ | —$CH_3$ | H | H | Do. |
| 13 | $C_2H_5S$— | —$COOC_2H_5$ | —$CH_3$ | H | H | Do. |
| 14 | $C_2H_5S$— | —$COC_6H_5$ | —$CH_3$ | H | H | Do. |
| 15 | $C_2H_5S$— | —$COC_6H_{11}$ | —$CH_3$ | H | H | Do. |
| 16 | $CH_3S$— | —$COCH_2CH_3$ | —$CH_3$ | H | H | Do. |
| 17 | $CH_3S$— | —$COCH(CH_3)_2$ | —$CH_3$ | H | H | Do. |
| 18 | $CH_3S$— | —$COCH_3$ | —$CH_3$ | H | 3-$CH_3$ | Do. |
| 19 | $CH_3S$— | —$COCH_3$ | —$CH_3$ | H | 4-$CH_3$ | Do. |
| 20 | $CH_3S$— | —$COCH_3$ | —$CH_3$ | H | 3,3,5-tri-$CH_3$ | Do. |
| 21 | $CH_3S$— | —$COOC_2H_5$ | —$CH_3$ | H | H | Do. |
| 22 | $CH_3CH_2CH_2S$— | —$COCH_3$ | —$CH_3$ | H | H | Do. |
| 23 | $CH_3CH_2CH_2S$— | —$COCH_3$ | H | —$CH_2CH_3$ | H | Do. |
| 24 | $CH_3CH_2CH_2S$— | —$COCH_3$ | H | —$CH_2CH(CH_3)_2$ | H | Do. |
| 25 | $CH_3(CH_2)_3S$— | —$COCH_3$ | —$CH_3$ | H | H | Do. |
| 26 | $C_6H_5CH_2S$— | —$COCH_3$ | —$CH_3$ | H | H | Do. |
| 27 | $C_6H_{11}S$— | —$COCH_3$ | —$CH_3$ | H | H | Do. |
| 28 | $C_6H_{11}S$— | —$COCH_2CH_3$ | —$CH_3$ | H | H | Do. |
| 29 | $C_6H_{11}S$— | —$COCH_2CH_3$ | H | —$CH_2CH_3$ | H | Scarlet. |
| 30 | $C_6H_{11}O$— | —$COCH_2CH_3$ | H | —$CH_2CH_2CN$ | H | Do. |
| 31 | $C_6H_{11}O$— | —$COCH_2CH_3$ | H | —$CH_2CH_2OC_2H_5$ | H | Pink. |
| 32 | $C_6H_{11}CH_2S$— | —$COCH_2CH_3$ | H | —$CH_3$ | H | Do. |
| 33 | $NCCH_2CH_2S$— | —$SO_2CH_3$ | —$CH_3$ | H | H | Do. |
| 34 | $H_2NCOCH_2CH_2S$— | —$CONHC_2H_5$ | —$CH_3$ | H | H | Do. |
| 35 | $C_6H_5CH_2CH_2S$— | —$CONHC_2H_5$ | —$CH_3$ | H | H | Do. |
| 36 | $C_6H_5CH_2O$— | —$COCH_3$ | H | —$CH_2CH_2OOCCH_3$ | 4-$C_2H_5$ | Scarlet. |
| 37 | $CH_3OOCCH_2CH_2S$— | —$COC_6H_4$-p-$CH_3$ | —$CH_3$ | H | H | Do. |
| 38 | $HOCH_2CH_2S$— | —$SO_2C_6H_4$-p-$CH_3$ | —$CH_3$ | H | H | Do. |
| 39 | $ClCH_2CH_2S$— | —$COCF_3$ | —$CH_3$ | H | H | Do. |
| 40 | $CH_3O$— | —$COCH_2CN$ | H | —$CH_2CH(CH_3)_2$ | H | Do. |
| 41 | $CH_3$— | —$COCH_3$ | —$CH_3$ | —$CH_2CH(CH_3)_2$ | H | Do. |
| 42 | $(CH_3)_2CHCH_2S$— | —$COCH_3$ | —$OC_2H_5$ | —$CH_3$ | H | Pink. |
| 43 | $CH_3CH_2$— | —$COCH_3$ | —$CH_3$ | H | H | Scarlet. |
| 44 | $C_6H_5$— | —$COCH_2Cl$ | —$CH_3$ | H | H | Red. |
| 45 | $C_6H_5CH_2$— | —$COCH_2OCH_3$ | —$CH_3$ | H | H | Scarlet. |
| 46 | $C_6H_5CH_2O$— | —$COCH_2C_6H_5$ | —$CH_3$ | H | H | Do. |
| 47 | $CH_3O$— | —$COCH_3$ | —$CH_3$ | H | H | Do. |
| 48 | $C_6H_{11}O$— | —$COCH_3$ | —$CH_3$ | H | H | Do. |
| 49 | Cl— | —$COCH_3$ | —$CH_3$ | H | H | Pink. |
| 50 | Br— | —$COCH_3$ | —$CH_3$ | H | H | Do. |
| 51 | $CH_3CONH$— | —$COCH_3$ | —$CH_3$ | H | H | Red. |
| 52 | $CH_3(CH_2)_3SO_2$— | —$COCH_3$ | —$CH_3$ | H | H | Violet. |

The novel azo compounds can be applied to nylon and polyester textile materials according to known disperse dyeing techniques. Various dispersing and wetting agents can be employed in the dispersion of the finely divided dye compound in an essentially aqueous dyebath. Procedures by which the compounds of the invention can be applied to nylon and polyester textile materials are described in U. S. Pat. Nos. 2,880,050; 2,757,064; 2,782,187; 3,100,134 and 3,320,021. The following examples illustrate methods for applying the novel compounds to polyamide fibers and polyester fibers, respectively.

EXAMPLE 53

The azo compound (50.0 mg.) of Example 6 is dispersed in 5 cc. of 2-methoxyethanol. A small amount (3–5 cc.) of a 3 percent sodium lignin sulfonate solution is added, with stirring, and then the volume of the bath is brought to 150 cc. with water. A 5.0 g. textile fabric made of nylon 66 fibers is placed in the bath which is then slowly brought to the boil. The dyeing is carried out at the boil for 1 hr. with occasional stirring. The dyed fabric is then removed from the dyebath, rinsed with water, and dried in an oven at 250° F. The fabric is dyed a bright shade of pink exhibiting excellent fastness properties when tested in accordance with the procedures described in the Technical Manual of the American Association of Textile Chemists and Colorists (AATCC), 1968 edition.

EXAMPLE 54

The azo compound of Example 8 (0.1 g.) is dissolved in 10 cc. of 2-methoxyethanol. A small amount (3–5 cc.) of a 3 percent sodium lignin sulfonate aqueous solution is added, with stirring, and then the volume of the bath is brought to 300 cc. with water. 3 cc. of a solvent carrier (Tanavol) is added in the bath and 10 g. of a textile fabric made of poly(ethylene terephthalate) fibers is placed in the bath and worked 10 min. without heat. The dyeing is carried out at the boil for 1 hr. The dyed fabric is removed from the dyebath and scoured for 20 min. at 80° C. in a solution containing 1 g./l. neutral soap and 1 g./l. sodium carbonate. The fabric is then rinsed, dried in an oven at 250° F. and heat set (for removal of residual carrier) for 5 min. at 350° C. The polyester fabric is dyed a bright pink shade which exhibits excellent fastness to light and resistance to sublimation when tested according to conventional AATCC procedures.

The compounds of the invention can also be applied to polyester textile materials by the heat fixation technique described in U. S. Pat. No. 2,663,612 and in the American Dyestuff Reporter, 42, 1 (1953).

As used herein, "nylon textile materials" means fibers, yarns and fabrics having a basis of a synthetic linear polyamide such as nylon 66 (polyhexamethylene adipamide) manufactured by the polymerization of adipic acid and hexamethylenediamine, nylon 6 (polycaprolactam) prepared from epsilon-amino-caproic acid lactam (caprolactam), and nylon 8. A detailed description of the synthetic polyamide materials which are dyed bright fast shades by the compounds of the invention is set forth in U. S. Pat. No. 3,100,134. Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U. S. Pat. NO. 2,901,446. Poly(ethylene terephthalate) polyester fibers are described, for example, in U. S. Pat. No. 2,465,319. The polymeric linear polyester materials disclosed in U. S. Pat. Nos. 2,945,010; 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60 percent phenol and 40 percent tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:

1. A fiber having a basis of a synthetic linear polyamide or a linear polyester dyed with a compound having the formula

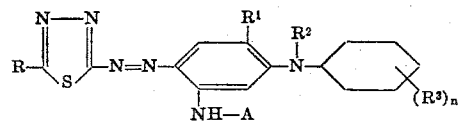

wherein
R is halogen, lower alkanoylamido; phenyl; phenyl substituted with lower alkyl, lower alkoxy, chlorine or bromine; $R^4$-; or $R^4$—X—; wherein $R^4$ is lower alkyl; allyl; cyclohexyl; or cyclohexyl substituted with lower alkyl; and X is —S— or —O—:
A is lower alkanoyl; lower alkanoyl substituted with chlorine, bromine, aryl, cyano, lower alkoxyl, benzyloxy, lower alkylthio, or lower alkylsulfonyl; lower alkoxycarbonyl; lower alkoxycarbonyl substituted with hydroxy, lower alkoxy or cyano; cyclohexylcarbonyl; each aryl group being phenyl, or phenyl substituted with lower alkyl, lower alkoxy, chlorine or bromine;
$R^1$ is hydrogen or lower alkyl;
$R^2$ is hydrogen, or when $R^1$ is hydrogen, lower alkyl;
$R^3$ is lower alkyl; and
n is 0, 1, 2 or 3.

2. A fiber having a basis of poly(hexamethylene adipamide), polycaprolactam, or poly(ethylene terephthalate) dyed with a compound defined in claim 1 wherein R represents the group $R^4$—X— and one of $R^1$ and $R^2$ is lower alkyl and the other is hydrogen.

3. A fiber having a basis of poly(hexamethylene adipamide) or polycaprolactam dyed with a compound defined in claim 1 and having the formula

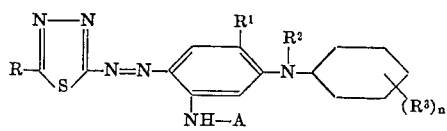

wherein $R^4$ is lower alkyl; X is —O— or —S—; A is lower alkanoyl, lower alkoxycarbonyl, or benzoyl; $R^1$ and $R^3$ each is hydrogen or methyl; $R^2$ is hydrogen or lower alkyl; and one of $R^1$ and $R^2$ is hydrogen.

4. A fiber according to claim 3 dyed with a compound defined therein in which $R^4$ is methyl or ethyl, A is acetyl or propionyl, and $R^2$ and $R^3$ is hydrogen.

* * * * *

UNITED STATES PATENT OFFICE
CERTIFICATE OF CORRECTION

PO-1050
(5/69)

Patent No. 3,762,861                    Dated October 2, 1973

Inventor(s) Max A. Weaver, James M. Straley, and William H. Moore

It is certified that error appears in the above-identified patent and that said Letters Patent are hereby corrected as shown below:

Column 1, line 32, delete "low" and insert ---lower---.

Column 1, line 63, delete "cycloakyl" and insert ---cycloalkyl---.

Column 2, line 7, delete "substitutrd" and insert ---substituted---.

Column 3, line 24, delete the entire line and insert ---X is -O- or -S-; A is lower alkanoyl, lower alk- ---.

Column 3, line 27, delete the entire line and insert ---or lower alkyl; one of $R^1$ and $R^2$ is hydrogen; and $R^3$ is---.

Column 3, line 50, delete "1976" and insert ---1967---.

Column 4, lines 24 and 25, after "3-(N-cyclohexyl-N-ethylamino)-" delete "recrystallized", first occurrence, and insert ---acetanilide---.

Column 6, line 1, delete "5-(N-cyclohexylamino)-2-(5-methlthio-1,3,4-" and insert --- 5-(N-cyclohexylamino)-2-(5-methylthio-1,3,4- ---.

Column 7, line 37, after "added", delete "in" and insert ---to---.

Column 8, line 51, delete "alkoxyl" and insert ---alkoxy---.

Column 9, delete the formula and insert

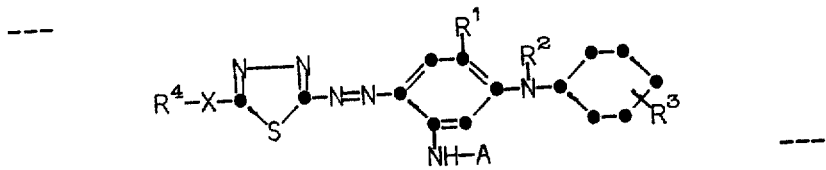

Signed and sealed this 23rd day of April 1974.

(SEAL)
Attest:

EDWARD M. FLETCHER, JR.

C. MARSHALL DANN
Commissioner of Patents